(12) United States Patent
Rippel

(10) Patent No.: US 7,510,159 B2
(45) Date of Patent: Mar. 31, 2009

(54) HANGER BAR CENTERING MECHANISM

(75) Inventor: Graham Michael Rippel, East Walpole, MA (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 11/117,680

(22) Filed: Apr. 28, 2005

(65) Prior Publication Data

US 2006/0243877 A1 Nov. 2, 2006

(51) Int. Cl.
*B42F 13/00* (2006.01)
(52) U.S. Cl. .................... 248/343; 248/323
(58) Field of Classification Search .......... 248/200.1, 248/323, 343
See application file for complete search history.

(56) References Cited

U.S. PATENT DOCUMENTS

| | | | | |
|---|---|---|---|---|
| 1,756,361 A | * | 4/1930 | Johnson | 220/3.4 |
| 2,316,389 A | * | 4/1943 | Atkinson | 248/300 |
| 2,594,605 A | * | 4/1952 | Zoppelt | 211/123 |
| 2,732,162 A | * | 1/1956 | Mckinley | 248/343 |
| 2,802,933 A | | 8/1957 | Broadwin | |
| 2,962,252 A | * | 11/1960 | Frank | 248/231.81 |
| 3,104,087 A | * | 9/1963 | Budnick et al. | 248/343 |
| 3,162,413 A | * | 12/1964 | Hexdall | 248/71 |
| 3,163,386 A | * | 12/1964 | Collins | 248/71 |
| 3,425,655 A | * | 2/1969 | Cogdill | 248/343 |
| 3,518,421 A | * | 6/1970 | Cogdill | 248/57 |
| 4,050,603 A | * | 9/1977 | Harris et al. | 220/3.9 |
| 4,293,895 A | * | 10/1981 | Kristofek | 362/147 |
| 4,336,575 A | | 6/1982 | Gilman | |
| 4,391,428 A | * | 7/1983 | Grimes | 248/546 |
| 4,494,296 A | * | 1/1985 | Grimes | 29/432 |
| 4,972,339 A | * | 11/1990 | Gabrius | 362/366 |
| 5,029,794 A | * | 7/1991 | Wolfe | 248/343 |
| 5,045,985 A | * | 9/1991 | Russo et al. | 362/366 |
| 5,386,959 A | * | 2/1995 | Laughlin et al. | 248/205.1 |
| 5,452,816 A | * | 9/1995 | Chan et al. | 220/3.8 |
| 5,505,419 A | * | 4/1996 | Gabrius | 248/343 |
| 5,593,115 A | * | 1/1997 | Lewis | 248/68.1 |
| 5,678,799 A | * | 10/1997 | Jorgensen et al. | 248/343 |
| 5,690,423 A | * | 11/1997 | Hentz et al. | 362/365 |
| 5,758,959 A | | 6/1998 | Sieczkowski | |
| 5,873,556 A | * | 2/1999 | Reiker | 248/323 |
| 5,934,631 A | * | 8/1999 | Becker et al. | 248/200.1 |
| 5,938,157 A | * | 8/1999 | Reiker | 248/200.1 |
| 5,957,574 A | | 9/1999 | Hentz et al. | |

(Continued)

FOREIGN PATENT DOCUMENTS

GB        22 39 085 A      6/1991

(Continued)

*Primary Examiner*—J. Allen Shriver, II
*Assistant Examiner*—Bradley H Duckworth
(74) *Attorney, Agent, or Firm*—James E. Cole; Middleton Reutlinger

(57) ABSTRACT

A hanger bar centering mechanism comprises a first elongate member having a first end and a second end, a second elongate member having a first end and a second end, the first and second members are symmetrically formed, the first and second elongate members each have at least one corresponding notch portion, and the notch portions are aligned for providing positive feedback when the first and second members are slidably positioned relative to each other in a preselected specific position.

16 Claims, 10 Drawing Sheets

U.S. PATENT DOCUMENTS

| | | | |
|---|---|---|---|
| 6,033,098 A * | 3/2000 | Hentz et al. | 362/430 |
| 6,076,788 A * | 6/2000 | Akiyama | 248/200.1 |
| 6,119,784 A * | 9/2000 | MacDonald et al. | 169/43 |
| 6,123,154 A * | 9/2000 | MacDonald et al. | 169/37 |
| 6,332,597 B1 * | 12/2001 | Korcz et al. | 248/343 |
| 6,491,270 B1 * | 12/2002 | Pfaller | 248/200.1 |
| 6,767,278 B1 * | 7/2004 | Peterson | 454/196 |
| 6,768,071 B1 * | 7/2004 | Gretz | 200/297 |
| 7,040,586 B2 * | 5/2006 | Kusber et al. | 248/200.1 |
| 2003/0006353 A1 * | 1/2003 | Dinh et al. | 248/343 |
| 2005/0045793 A1 * | 3/2005 | Johnson et al. | 248/343 |

FOREIGN PATENT DOCUMENTS

| | | |
|---|---|---|
| GB | 2239085 A | 6/1991 |
| JP | 540 121 82 A | 1/1979 |
| JP | 54012182 A | 1/1979 |

* cited by examiner

HANGER BAR CENTERING MECHANISM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING ETC

None.

BACKGROUND

1. Field of the Invention

The present invention provides a centering mechanism for a recessed downlight frame-in kit. More specifically, the present invention comprises a hanger bar centering mechanism for a recessed downlight frame-in kit.

2. Description of the Related Art

Recessed downlight fixtures have become increasingly popular for residential and commercial use. One reason for the increased popularity is that the recessed downlight fixtures meet a wide range of interior lighting requirements while also being aesthetically pleasing. Further these recessed downlight fixtures may be installed in new constructions as well as existing ceilings and therefore are liked by installers. Typically, ceiling-mounted recessed downlight fixtures comprise a frame or frame-in kit with means for securing the frame to structural supports of the ceiling. For installation, the frame of the light fixture may include holes or brackets through which fasteners are used to position and attach the fixture to the supports.

One difficulty associated with the installation of recessed lighting frame-in kits is the positioning of the frame-in kit in a centered position between joists or suspended ceiling members quickly in a repetitive and consistent manner. For example, when one light in a row of recessed lights is out of alignment, the installation looks poor in quality and is undesirable for a customer. In suspended ceilings it is preferable to have the lights centered in two dimensions so that the light fixture is centered within a block of the suspended ceiling. The result is an aesthetically pleasing installation which is time consuming and difficult to obtain consistently.

One facet in solving this problem is that in many applications distances between ceiling joists or suspended ceiling members are consistent. For example, most ceiling joists or suspended ceiling members may be spaced apart on two feet (24 inch) centers. Building codes within geographic regions typically dictate such distances. Since such span between members is known and is consistently used in many constructions, it would be helpful for installers to utilize a mechanism to quickly and consistently center the recessed downlight fixture between ceiling members to provide an aesthetically pleasing installation.

Thus there is a need for a positioning mechanism, for example, a centering mechanism which provides positive feedback to an installer and may be utilized quickly and consistently with frame-in kits for centering light fixtures during lighting installations.

SUMMARY OF THE INVENTION

According to a first embodiment of the present invention, a hanger bar centering mechanism comprises a first elongate member having a first end and a second end, a second elongate member having a first end and a second end, the first and second members are symmetrically formed, the first and second elongate members each have at least one corresponding notch portion, and the notch portions are aligned for providing positive feedback when the first and second members are slidably positioned relative to each other in a preselected specific position.

The first and second elongate members each have a first notch portion and a second notch portion. The longitudinal edge of the elongate member has an upper notch portion and a lower notch portion disposed on upper and lower edges, respectively of the first and second elongate members. The first and second symmetrical elongate members may be channel shaped or may be substantially v-shaped.

The mounting plate is movable from a first longitudinally aligned position to a second non-aligned position. The mounting plates are located at one of the first end and the second end of the first and second elongate members.

The hanger bar centering mechanism may further comprise a clip mechanism retaining the first and second elongate members in sliding engagement and locking the first and second elongate members in a centered position. The clip mechanism and the notch portions also provides positive feedback to an installer that the first and second elongate members are disposed in the preselected position.

According to a second embodiment, a hanger bar centering mechanism comprises a clip mechanism having at least one preselected dimension, first and second channels slidably positioned adjacent the clip mechanism, the first and second channels each have at least one notch of the preselected dimension, the at least one notch receiving the clip mechanism when the first and second channels are in a preselected position.

The hanger bar centering mechanism further comprises a mounting plate at one end of each of the first and second channels. The at least one notch and the clip mechanism operably engage and provide positive feedback to an installer that first and second channels are disposed in a centered position. The clip mechanism slidably retains said first and second channels in a centered position. The clip mechanism locks the first and second channels in the centered position.

According to a third embodiment, a hanger bar locking mechanism comprises a first elongate member slidably abutting a second elongate member, the first and second elongate members both have one of a male part and a female part, a clip mechanism defines the other of a male part and a female part, the clip mechanism engages the first and second elongate members when the first and second elongate members are in a centered position, the ring aperture is centrally located between ends of the first and second elongate members.

According to a fourth embodiment, a hanger bar locking mechanism comprises a first elongate member of a first preselected length having a male portion, a second elongate member of a second preselected length has a female portion, the first elongate member slidably engages the second elongate member, the male portion engages said female portion when the first elongate member and the second elongate member are positioned for a specific spacing between ceiling members. The first and second preselected lengths may be equal or unequal. The device may further comprise a clip mechanism to retain the first and second members in the centered position.

DETAILED DESCRIPTION

Figure 1:
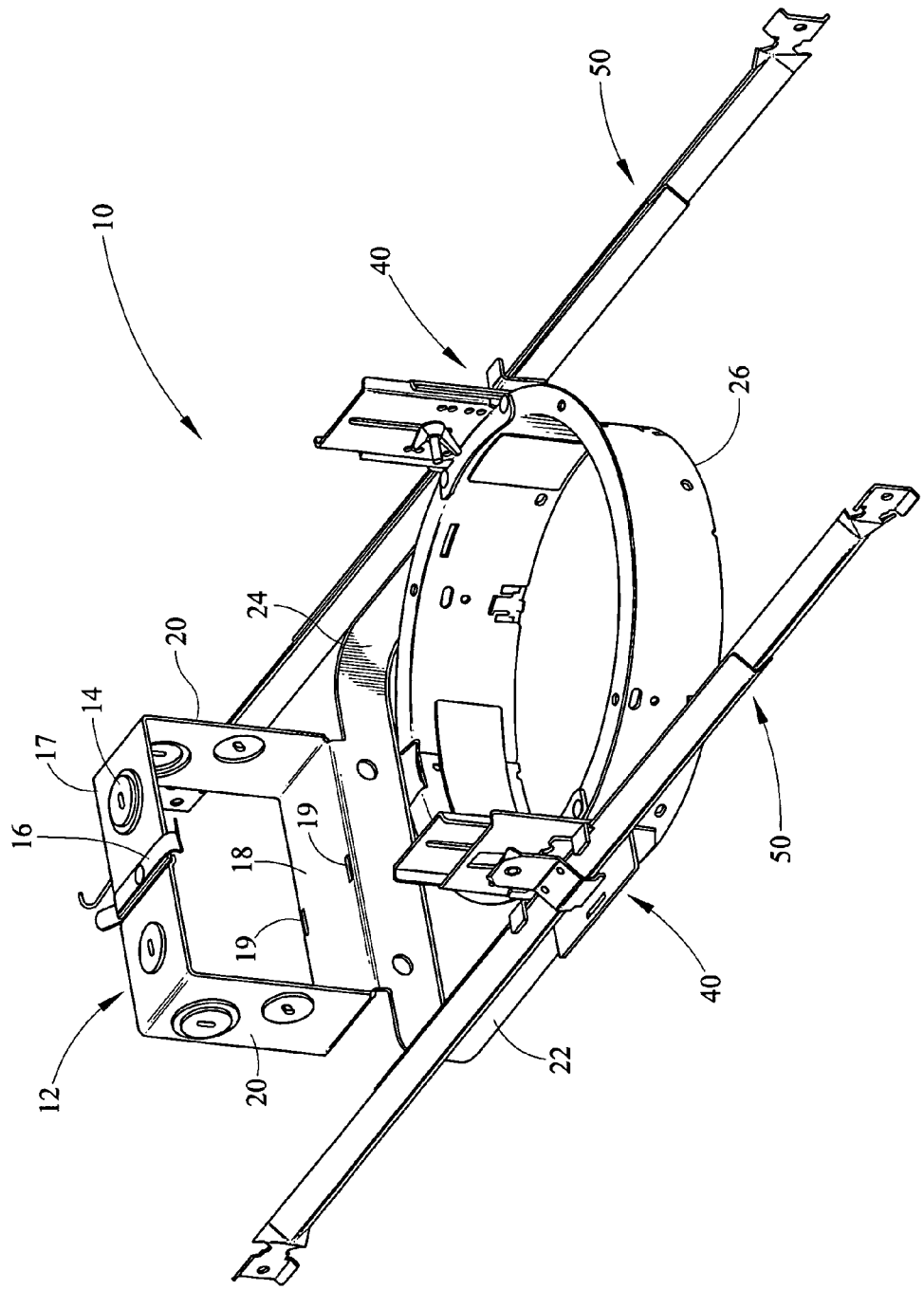
FIG. 1 depicts a perspective view of a recessed downlight frame-in kit.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention however, other alternative mechanical configurations are possible which are considered to be within the teachings of the instant disclosure.

Referring initially to FIG. 1, a frame-in kit or plaster frame 10 is shown in perspective view. The frame-in kit 10 is typically installed in ceilings or suspended ceiling installations. The frame-in kit 10 defines a location for housing recessed lighting components. The frame-in kit 10 comprises a junction box 12 wherein wire splices may be disposed for electrical communication between a ballast (not shown) and a light source or lamp, such as an HID lamp (not shown). The junction box 12 comprises a top wall 17, a bottom wall 18, and opposed side walls 20 to partially define the junction box and front and rear openings. The bottom wall 18 is substantially rectangular in shape and contains a plurality of door tab apertures 19.

The junction box 12 further comprises front and rear junction box doors (not shown) which are substantially square in shape but may be rectangular or some other geometry according to the shape of the junction box openings. The doors also each have at least one tab extending from a lower edge thereof. The tabs are positioned within tab apertures 19 in the bottom wall 18 of the junction box 12 so that the doors extend upwardly from the bottom wall closing the front and rear openings. At the upper wall 17, the front and rear doors (not shown) are retained in place by a door arm 16. The door arm 16 has an aperture therein which is aligned with a fastening aperture in the top wall 17. A fastener, for instance a rivet or screw, is positioned through the fastening apertures to retain the door arm 16.

Referring still to FIG. 1, the sidewalls 20 and the upper wall 17 each may have at least one knockout 14 therein to provide a plurality of paths for electrical wires and conduit to move from within the junction box 20 to the lamp housing 12 as well as a plurality of knock-outs 14 for entry of wiring into the junction box 12.

Extending from an edge of the junction box 12 are frame arms 22, 24. The frame arms 22, 24 are spaced apart a preselected diameter based on a fixture ring 26 being used. The exemplary fixture ring 26 is circular in shape having a sidewall and an upper shoulder and receives the fixture, light source and other components within the ceiling wherein the frame-in kit 10 is positioned. Since a fixture assembly (not shown) may comprise alternative sizes and shapes, the fixture ring 26 is appropriately sized for the fixture used and the frame arms 22,24 are sized to receive the ring 26. The frame arms 22,24 are connected to the fixture ring 26 by fastener or alternative means of connection. Clip mechanisms 40 are operably connected to the upper shoulder of the fixture ring 26 in diametrically opposed positions and therefore are aligned with the center of the aperture ring 26. The clip mechanisms 40 will be discussed further hereinafter.

Referring still to FIG. 1, extending through the clip mechanisms 40 are hanger bars 50 specifically, two hanger bars 50 are slideably disposed through each clip mechanism 40. The hanger bars 50 are extending through the clip mechanisms 40 in a parallel arrangement for installation of the frame-in kit 10 between two ceiling members. Typically the frame-in kit 10 is arranged so that the hanger bars 50 extend transversely relative to parallel structural ceiling members.

Figure 2:
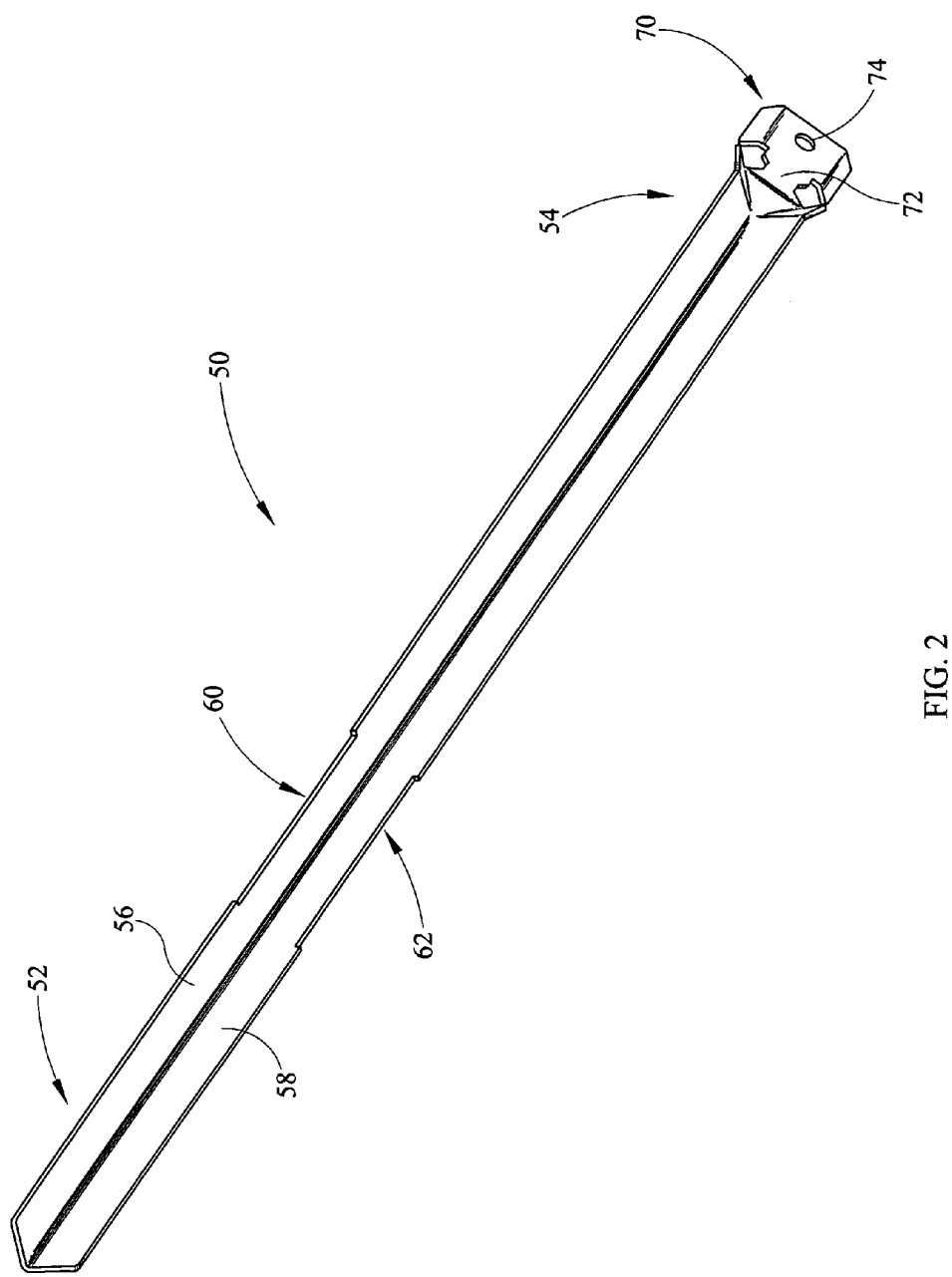
FIG. 2 depicts a perspective view of a single hanger bar.

Referring now to FIG. 2, a single hanger bar 50 is shown in perspective view. The hanger bar 50 is an elongate member having a first end 52 and a second end 54. The hanger bar 50 is substantially V-shaped and, as shown, has an upper leg 56 and a lower leg 58 which define the V-shaped channel or beam. However, it should be understood by one of ordinary skill in the art that alternative shapes and structures may be utilized which, when placed together as shown and described herein, slide relative to one another without substantial interference. The hanger bar 50 comprises an upper notch 60 and a lower notch 62 which operably engage portions of the clip mechanism 40. The upper and lower notches 60, 62 are positioned on the hanger bar 50 such that when the notches 60,62 are aligned and engage the clip mechanisms 40 (FIG. 1), the second ends 54 of each hanger bar 50 extend an equal distance from the center of the fixture ring 26. Accordingly, such construction allows for the installation of the framing kit 10 in such a manner that the fixture ring 26 is centered between ceiling members in a centered position. Alternatively, the bars 50 may be formed so that when the notches 60, 62 are aligned the ring 26 is at some pre-selected position for various installation scenarios. The upper and lower notches 60, 62 are utilized so that the hanger bars 50 are symmetrical in shape. Thus a single hanger bar 50 may be manufactured and utilized for mounting the frame-in kit 10 rather than requiring the manufacture of multiple hanger bars for use with a single assembly. The upper and lower notches 60, 62 are substantially U-shaped and are defined by 90° (degrees) angles forming the notched portions of the longitudinal edges of the hanger bar 50. The angles defining the upper and lower notches 60, 62 may vary but according to one exemplary embodiment are about 90°. Such angle provides the user with positive feedback and a definitive snapping feel when the clip mechanism 40 engages the notches 60, 62.

At a second end 54 of the hanger bar 50 is a mounting plate 70 which is connected to the elongate portion of hanger bar 50 by a neck 72. The mounting plate 70 further comprises a fastening aperture 74 through which a fastener may be connected to a joist to retain the hanger bar 50 in position relative to the member. The mounting plate 70 may be folded at the neck 72 such that the plate is perpendicular to the longitudinal axis of the hanger bar 50 and parallel to an adjacent ceiling member in order to properly fasten the mounting plate 70 to the ceiling member.

Figure 3:
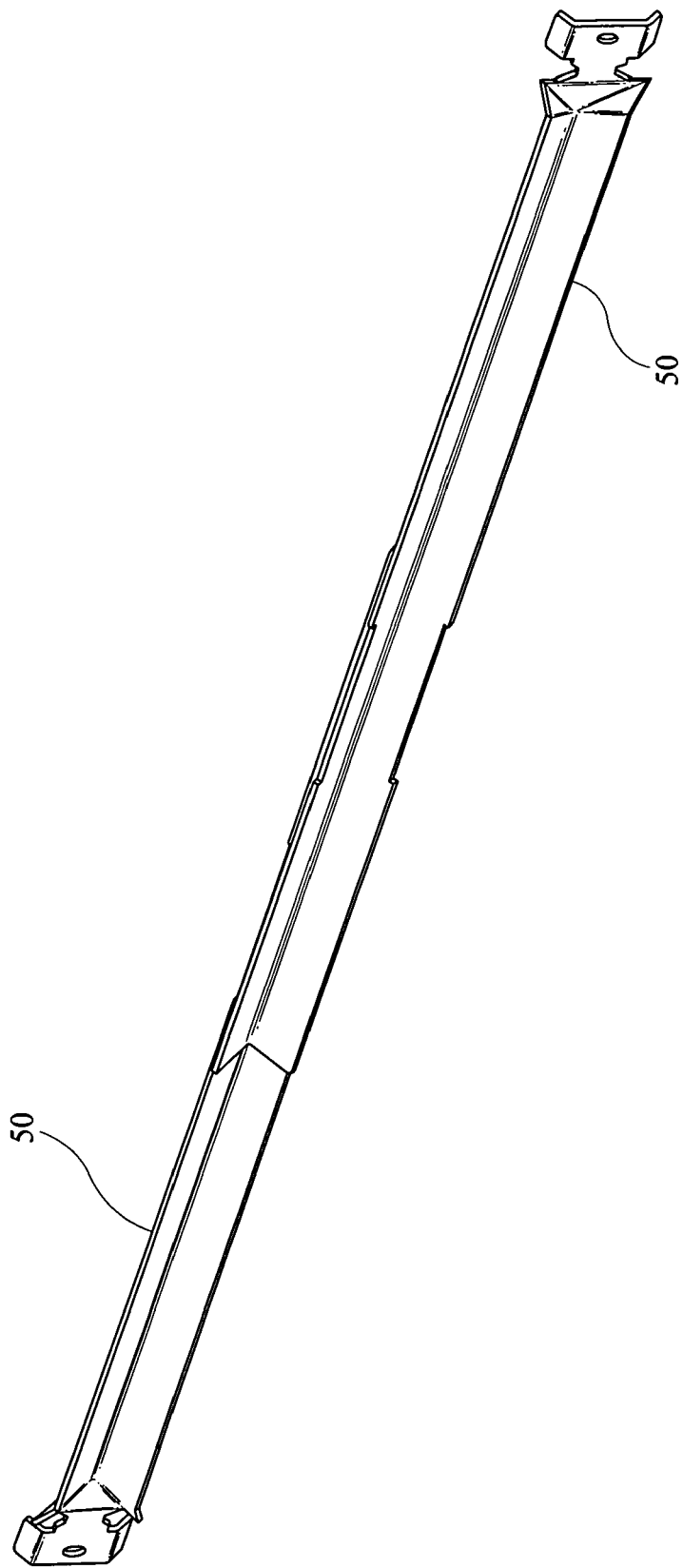
FIG. 3 depicts a perspective view of two hanger bars slidably positioned against one another.

Referring now to FIG. 3, the hanger bars 50 are shown in perspective view and positioned relative to one another for sliding movement. The channel shapes of the elongate members provide for adjacent positioning and for sliding motion of the hanger bars 50 relative to one another and relative to the clip mechanism 40 (FIG. 1). The hanger bars 50 are shown in a position such that the upper and lower notches 60, 62 of each hanger bar 50 are not aligned. To align the notched 60,62 the bars 50 are moved longitudinally so that the notches are aligned.

Figure 4:
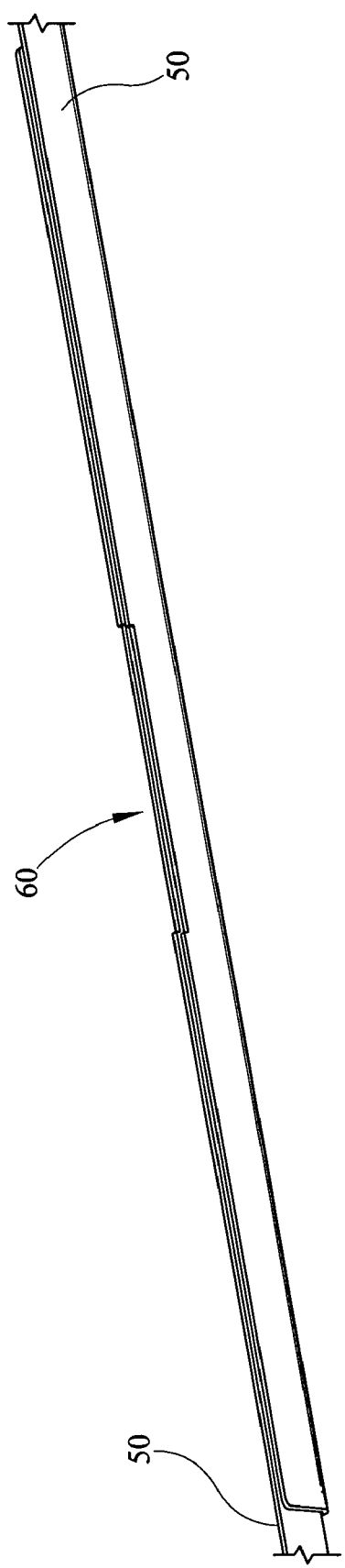
FIG. 4 depicts a perspective view of the two hanger bars of FIG. 3 with notches aligned for centering of the frame-in kit of FIG. 1.

Referring now to FIG. 4, the hanger bars 50 are shown with the upper and lower notches 60, 62 aligned as would be the case when the clip mechanism 40 engages both adjacent hanger bars 50. The clip mechanism 40 is removed to clearly depict the alignment of the upper and lower notches 60, 62. When the notches 60,62 are aligned and engaging the clip mechanism 40, the ring 26 is in a preselected specific position, for example the centered position.

Figure 5:
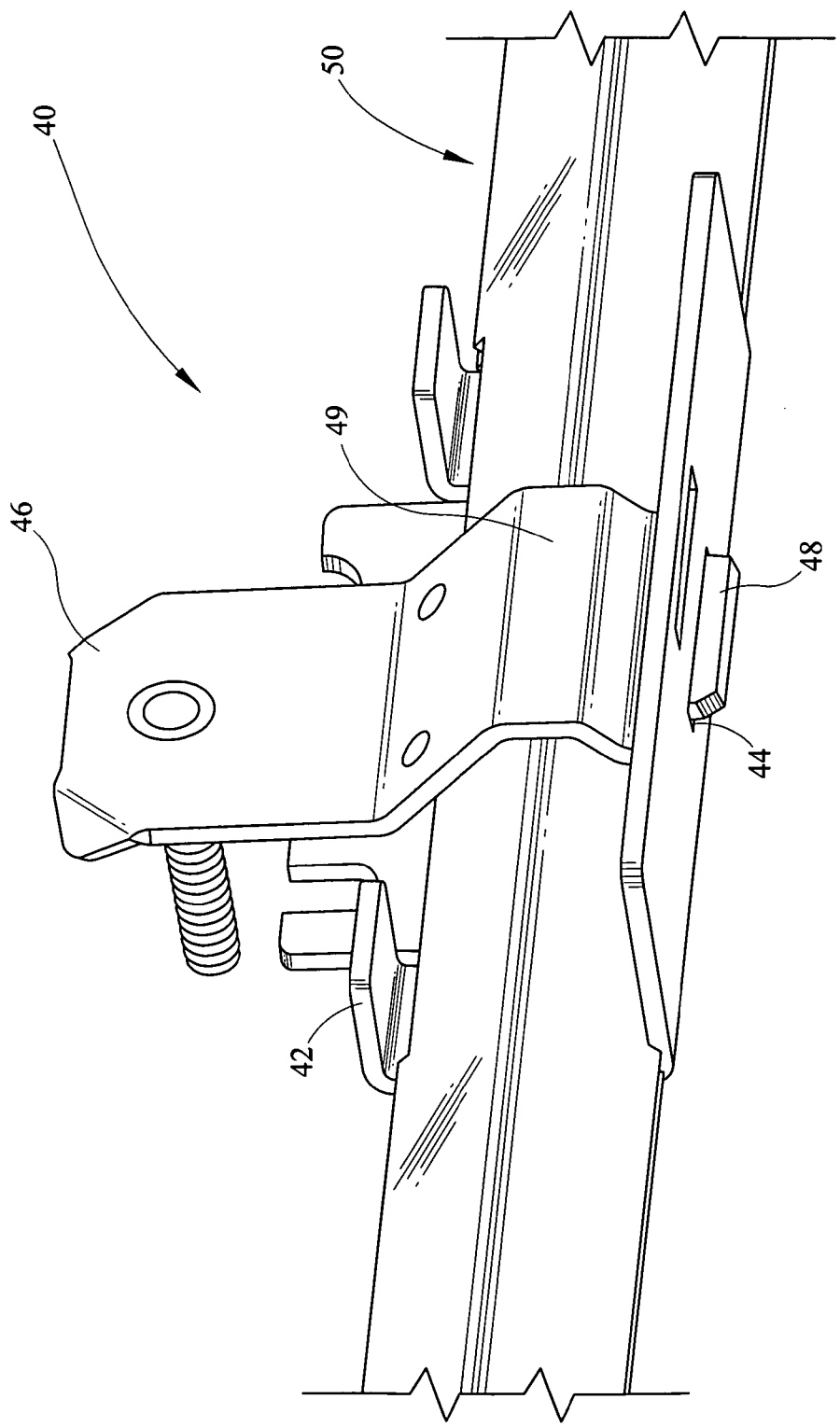
FIG. 5 depicts a close-up perspective view of the hanger bars and fastening mechanism.

Referring now to FIG. 5, the clip mechanism 40 is shown retaining the hanger bars 50 in position. The clip mechanism 40 comprises a C-shaped clip portion 42, the clip portion 42 comprises upper and lower horizontal surfaces and a vertical surface extending between the upper and lower vertical surfaces defining the C-shape and further defining a position for retaining the hanger bars 50. The lower horizontal surface of the clip portion 42 comprises a clasp aperture 44 for receiving a tab from a clasp 46. Although the clip portion 42 is shown as C-shaped, various alternative geometries may be utilized to retain the hanger bars 50 in position. As depicted in the figure, the edges of the clip portion 42 engage the notched portions 60, 62 of the hanger bars 50. The clasp 46 comprises a metal strap having four edges and a tab 48 depending from a lowermost edge of the clasp 46. The tab 48 extends through the clasp aperture 44 of the clip portion 42 to inhibit movement of the clasp 46 away from the C-shaped clip portion 42. The clasp 46 also has a bulged portion 49 opposite the vertical surface of the clip portion 42. The bulged portion of clasp 46 also provides for positioning of the hanger bars 50 between the clip portion 42 and clasp 46. At the upper end of the clasp 46 is a threaded fastener which may be tightened with a wing nut as shown in FIG. 1 to tighten the clasp 46 and provide some vertical adjustment feature.

Figure 6:
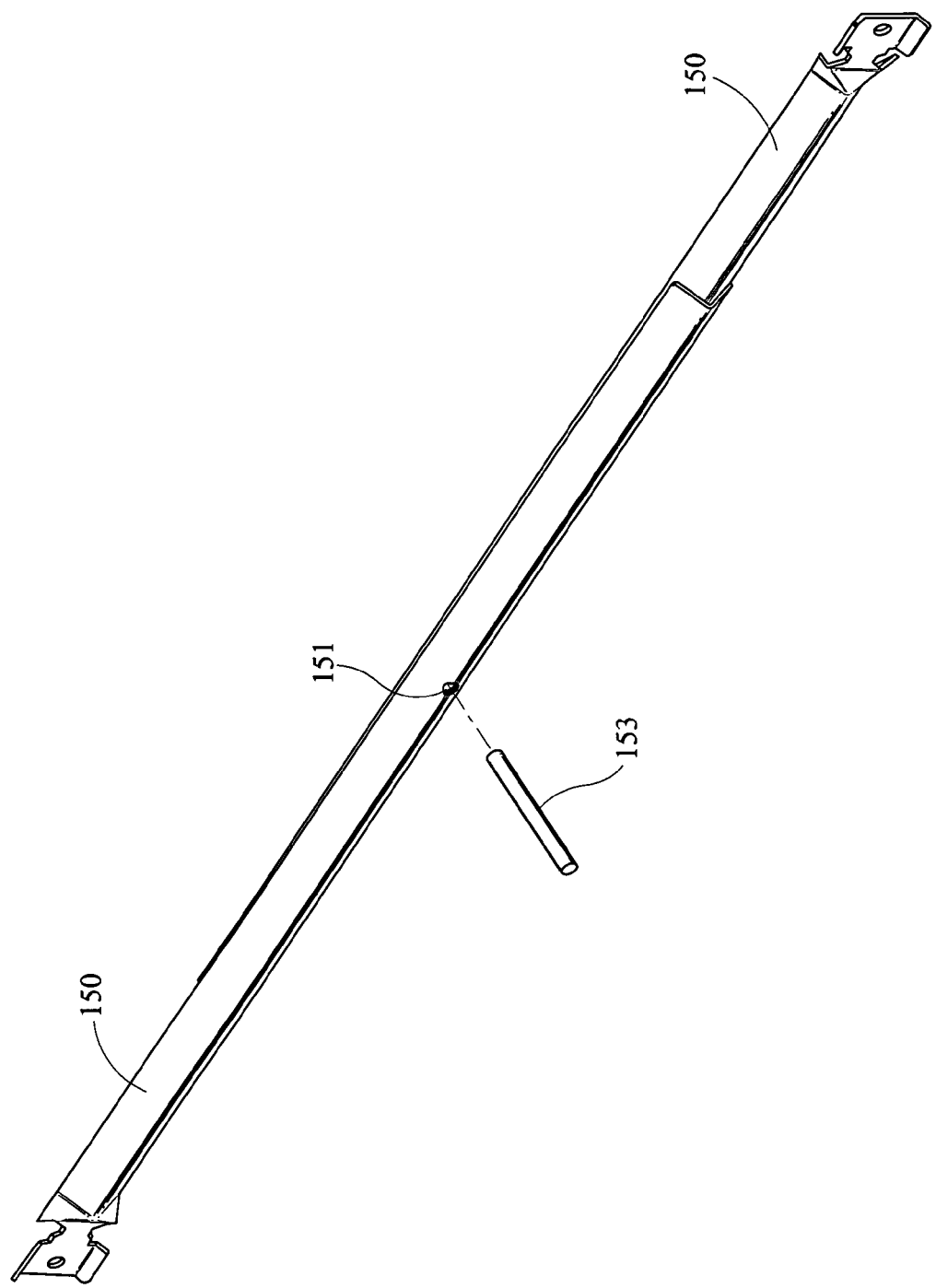
FIG. 6 depicts a first alternative embodiment of the hanger bar centering mechanism.

Referring now to FIGS. 6-10, various alternative embodiments of the hanger bar centering mechanism are depicted in perspective view. Referring first to FIG. 6, first and second slideably positioned channels or bars 150 are depicted. The channels are adjacent one another and disposed so as to slide longitudinally relative to one another as described previously. The structural shape allows the bars to be positioned slidably adjacent one another. The bars 150 are symmetrically shaped so that a single bar design may be utilized for the right hand and left hand sides of the frame-in kit (FIG. 1). The bars 150 further comprise apertures 151 which become aligned when the bars 150 are positioned to fit between ceiling members of a preselected spacing. For example, the members may be on 16 inch centers or alternatively on 24 inch centers as building codes differ within different geographic regions and the hanger bars 150 may be manufactured for use within these distances. The aperture 151 receives a rod 153 so that the rod 153 extends through both of the hanger bars 150 and locks the hanger bars 150 in a position to be disposed between the pre-selected ceiling member spacing. Otherwise stated, the symmetrical hanger bars 150 comprise female parts 151 which receive a male part 153 extending through both hanger bars 150 to lock the hanger bars in the pre-selected spacial position. It should be understood that the hanger bars may be manufactured to various pre-selected lengths corresponding to the on-center distance of suspended ceiling member or joists or may be manufactured so that the aperture ring is disposed at some other pre-selected position.

Figure 7:
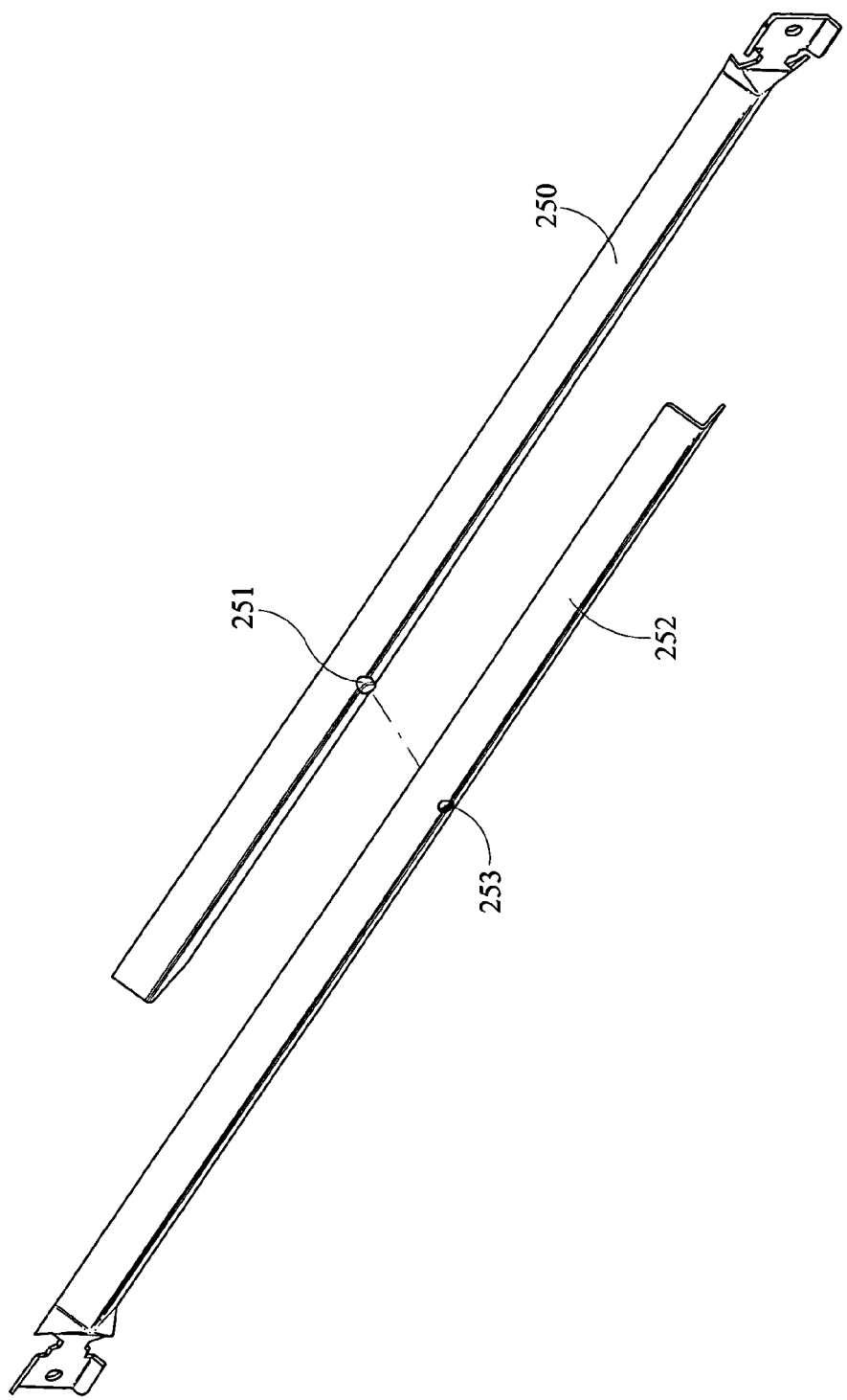
FIG. 7 depicts a second alternative embodiment of the hanger bar centering mechanism.

Referring now to FIG. 7, an alternative embodiment of the hanger bar centering mechanism is shown. The embodiment depicted in FIG. 7 comprises two slidably adjustable channels having structural geometry allowing longitudinal slidable motion relative to one another. The first channel 250 is an elongate member having a boss 251 extending from that elongate member. The second channel 252 is also an elongate member having a similar geometric or structural shape to allow sliding motion relative to the first channel 250. The second channel 252 further comprises an aperture 253 which receives the boss 251 of the first channel 250. When the boss 251 and the aperture 253 are aligned the lengths of the first and second channels 250, 252 are positioned so that the channels 250, 252 extend between ceiling members of a preselected center distance.

Figure 8:
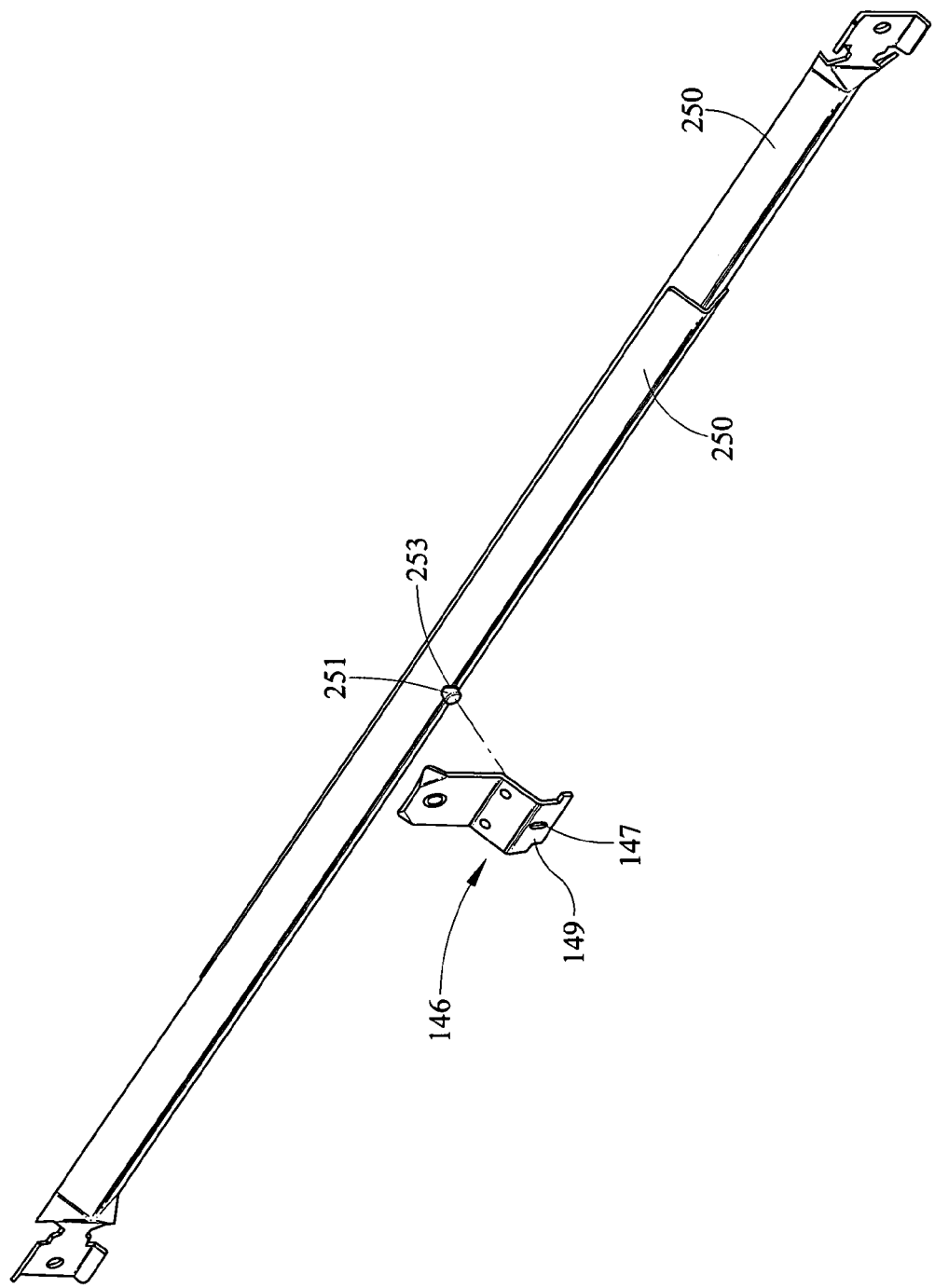
FIG. 8 depicts a clip for use with the second alternative embodiment of FIG. 7.

Referring now to FIG. 8, a portion of the clip mechanism 40 is shown. The clasp 146 is shown having an aperture 147 in the bulged portion 149. The aperture 147 receives the boss 251 which is extending through the aperture of the second channel 252 in order to retain the hanger bars 250, 252 in the appropriate position relative to the other portions of the frame-in kit 10.

Figure 9:
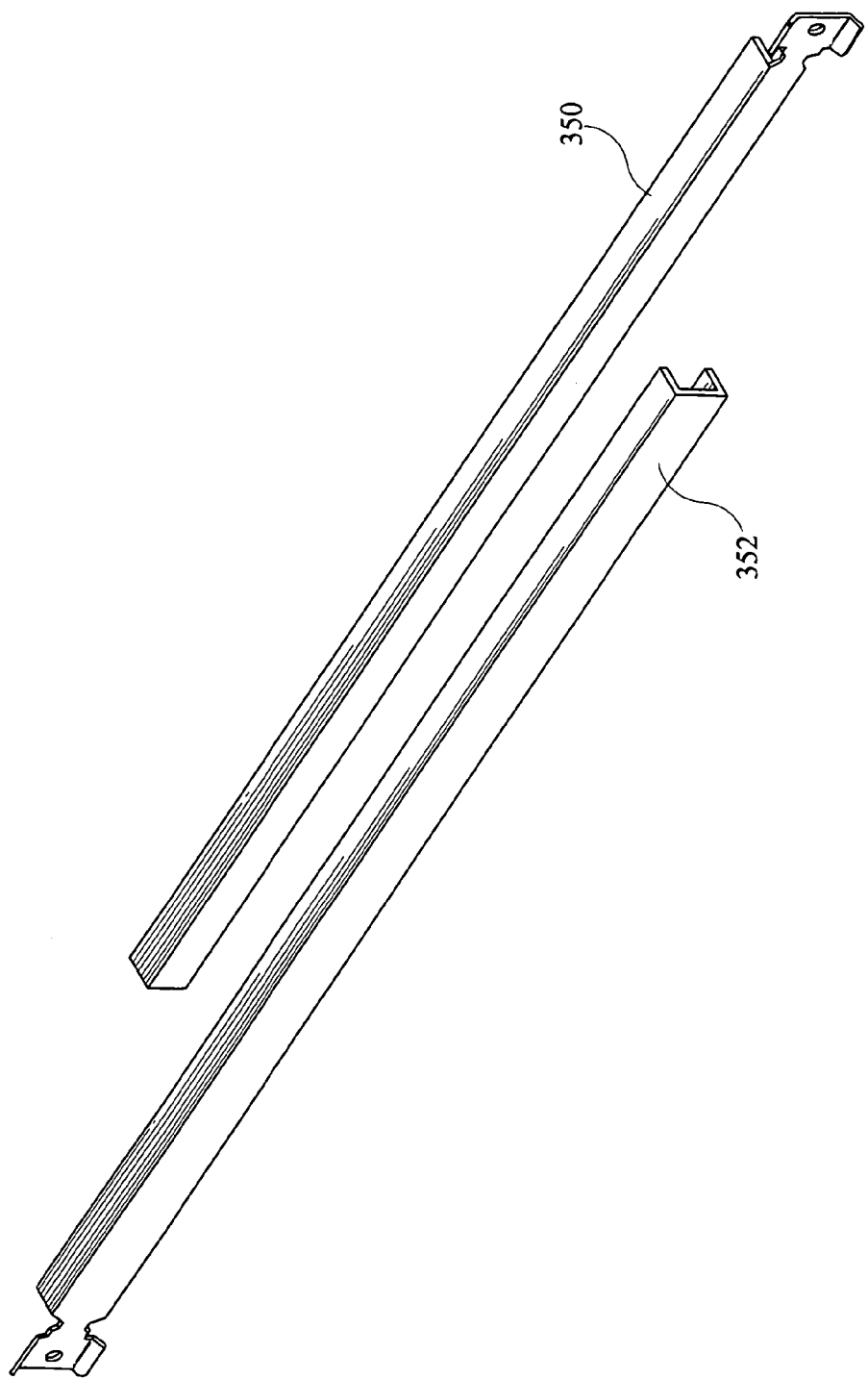
FIG. 9 depicts a third alternative embodiment of the hanger bar centering mechanism; and, FIG. 10 depicts a fourth alternative embodiment of the hanger bar centering mechanism.

As shown in FIG. 9, an alternative assembly of hanger bars 350, 352 is shown. The first hanger bar 350 is substantially L-shaped. The second hanger bar 352 comprises a C-shaped channel structure which receives the L-shaped first hanger bar 350. Alternatively, the L-shaped first hanger bar 350 may also be C-shaped and sized to fit within the web portion of the second hanger bar 352. Thus, such design allows the first hanger bar 350 to slide relative to second hanger bar 352. The bars 350, 352 may be locked for a pre-selected specific position by many of the structures taught herein including male-female portions, notches, or other equivalent structures which lockably engage upon reaching the pre-selected position.

Figure 10:
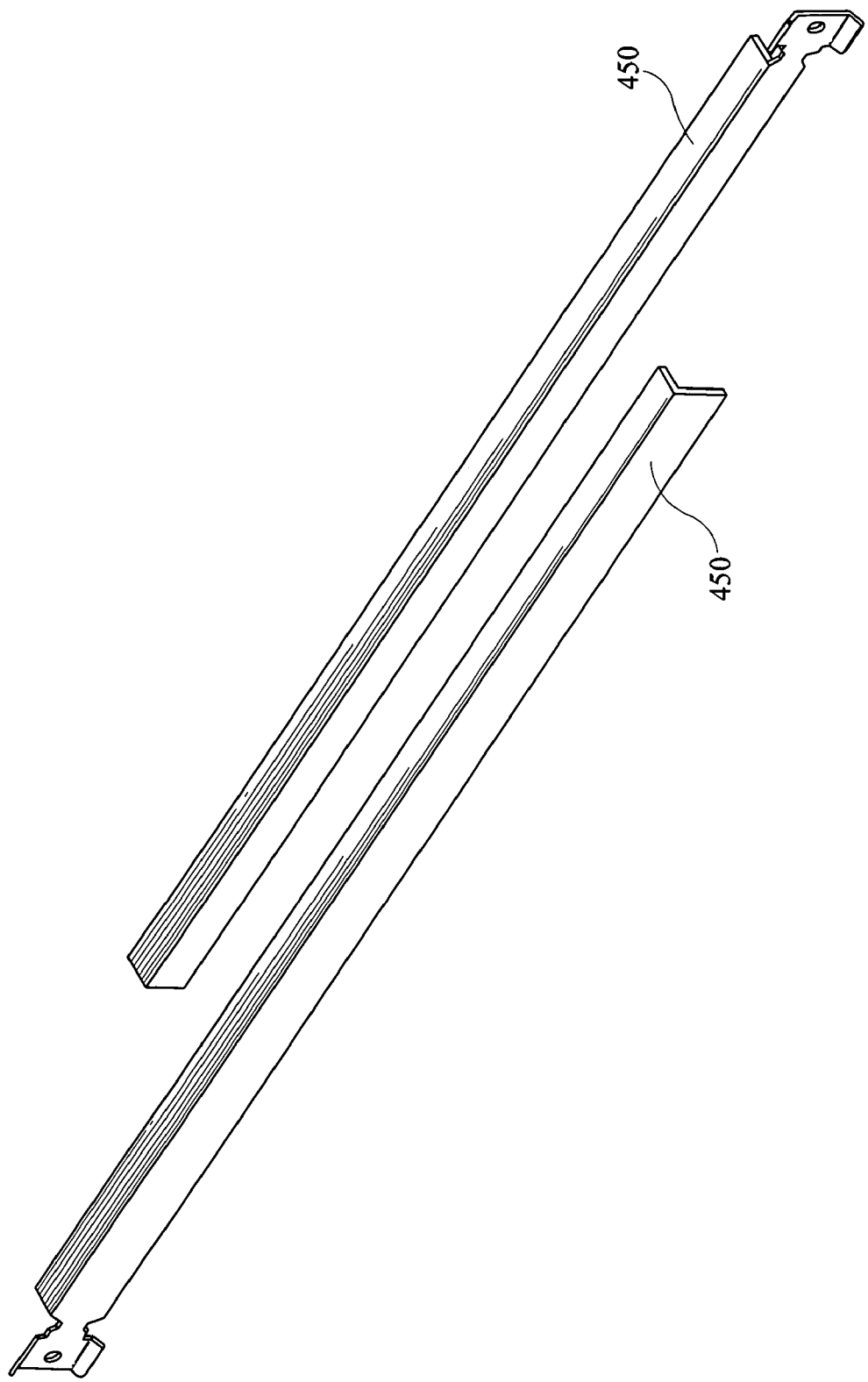

Referring now to FIG. 10, an alternative structural embodiment is depicted for the channels. According to the embodiment of FIG. 10, both elongate members 450 are substantially L-shaped wherein one leg is shorter than the second leg allowing the elongate members to slide relative to one another. It should be understood by one of ordinary skill in the art that the various notches, male and female parts or bosses and apertures may be utilized with various structural shapes taught throughout the various embodiments described in the instant disclosure.

In operation, two hanger bars 150 are inserted through and captured by end clip mechanism 40. The clip mechanism 40 is tightened so that the pair of hanger bars 150 are captured within each clip mechanism 40 but are slidable. Next the hanger bars 150 are pulled apart or pushed together longitudinally by the ends having the mounting plates 70 until the notches 60, 62 are aligned. As the hanger bars 150 are pulled apart, the notches 60,62 will each engage the clip mechanism 40, either separately or simultaneously. Once the notches 60,62 are engaging the clip mechanism 40, the clip mechanism may be tightened further, if necessary. According to other embodiments described herein, when the hanger bars are aligned male and female parts engage one another.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A hanger bar centering mechanism, comprising:
a first elongate member having a first end and a second end and a first longitudinal axis extending between said first and second ends of said first elongate member;
a second elongate member having a first end and a second end and a second longitudinal axis extending between said first and second ends of said second elongate member;
each of said first and second members being symmetrically formed about said axes extending along the length of each of said first and second members;
a clip mechanism slidably receiving at least one of said first and second members;
said first and second elongate members each having symmetrically disposed notch portions along an upper edge and a lower edge of said first and second members;
said notch portions being aligned in a direction substantially transverse to said longitudinal axes for receiving a portion of said clip mechanism and providing positive feedback when said first and second members are slidably positioned relative to each other in a specific position for connection to a ceiling support member.

2. The hanger bar of claim 1, said notch portions comprising a first notch portion and a second notch portion disposed on each of said first and second elongate members.

3. The hanger bar of claim 2, wherein said first notch portion is an upper notch portion and said second notch portion is a lower notch portion disposed on upper and lower edges, respectively of said first and second elongate members.

4. The hanger bar of claim 1 further comprising a mounting plate at one of said first end and said second end of said first and second elongate members.

5. The hanger bar of claim 4, said mounting plate being movable from a first position longitudinally aligned with said elongate members to a second non-aligned position.

6. The hanger bar of claim 1, said first and second symmetrical elongate members being channel shaped.

7. The hanger bar of claim 1, said first and second symmetrical elongate members being substantially v-shaped.

8. The hanger bar of claim 1 wherein said clip mechanism retains said first and second elongate members in sliding engagement and locking said first and second elongate members in a centered position wherein an aperture ring is centered with respect to ceiling members.

9. The hanger bar of claim 1, said clip mechanism and said notch portions locking and providing said positive feedback to an installer that said first and second elongate members are disposed in said specific position.

10. A hanger bar centering mechanism, comprising:
a clip mechanism having at least one portion of said clip mechanism with at least one preselected dimension;
a first channel positioned slidably adjacent a second channel, said first and second channels both slidably received by said clip mechanism;
said first and second channels each having at least one notch of said preselected dimension;
each of said at least one notch receiving said at least a portion of said clip mechanism and providing positive feedback when said first and second channels are in a preselected position for connection to ceiling support members.

11. The hanger bar centering mechanism of claim 10 further comprising a mounting plate at one end of each of said first and second channels.

12. The hanger bar centering mechanism of claim 11, said at least one notch and said clip mechanism operably engaging and providing positive feedback to an installer that said first and second channels are disposed in a centered position wherein an aperture ring is centered with respect to said ceiling support members.

13. The hanger bar centering mechanism of claim 10, said clip mechanism retaining said first and second channels in a centered position wherein an aperture ring is centered with respect to ceiling support members.

14. The hanger bar mechanism of claim 13, said clip mechanism locking said first and second channels in said centered position wherein an aperture ring is centered with respect to ceiling support members.

15. A hanger bar centering mechanism, comprising:
a clip mechanism having at least one portion of said clip mechanism having at least one preselected dimension;
a first channel positioned slidably adjacent a second channel, said first and second channels slidably received by said clip mechanism;
said first and second channels each having at least one notch corresponding to said preselected dimension;
each of said at least one notch receiving said at least one portion of said clip mechanism when said channels are arranged with one of said at least one notch located directly adjacent and in alignment with the other of said at least one notch for connection to ceiling members;
each of said at least one notch receiving said clip mechanism and providing visual indication of alignment and providing positive feedback when said first and second channels are slidably positioned in a specific position.

16. A hanger bar centering mechanism, comprising:
a first hanger bar portion having a first end and a second end and a first longitudinal axis extending between said first and second ends of said first hanger bar;
a second hanger bar portion having a first end and a second end and a second longitudinal axis extending between said first and second ends of said second hanger bar;
said first and second hanger bar portions each having at least one notch along corresponding outer edges;
a clip mechanism slidably receiving said first hanger bar portion and said second hanger bar portion;
said first hanger bar portion slidably positioned directly adjacent said second hanger bar portion wherein said notches of said first hanger bar portion and said second hanger bar portion form a common opening when aligned;
said common opening receiving at least a portion of said clip mechanism when said first and second hanger bar portions are at a preselected position defining said common opening and providing user feedback.

* * * * *